US011945659B2

(12) United States Patent
Baenteli

(10) Patent No.: US 11,945,659 B2
(45) Date of Patent: Apr. 2, 2024

(54) TRANSPORT DEVICE FOR CONVEYING PRODUCTS, IN PARTICULAR PACKAGED AND NON-PACKAGED FOOD, AND PRODUCTION INSTALLATION AND METHOD WITH SUCH A TRANSPORT DEVICE FOR CONVEYING PRODUCTS

(71) Applicant: Syntegon Packaging Systems AG, Beringen (CH)

(72) Inventor: Linus Baenteli, Winterthur (CH)

(73) Assignee: Syntegon Packaging Systems AG, Beringen (CH)

( * ) Notice: Subject to any disclaimer, the term of this patent is extended or adjusted under 35 U.S.C. 154(b) by 28 days.

(21) Appl. No.: 17/826,489

(22) Filed: May 27, 2022

(65) Prior Publication Data

US 2022/0380142 A1 Dec. 1, 2022

(30) Foreign Application Priority Data

May 28, 2021 (DE) ...................... 10 2021 113 902.3

(51) Int. Cl.
*B65G 47/64* (2006.01)
*B65G 15/24* (2006.01)
(Continued)

(52) U.S. Cl.
CPC ........... *B65G 47/645* (2013.01); *B65G 15/24* (2013.01); *B65G 39/12* (2013.01); *B65G 41/002* (2013.01); *B65G 45/12* (2013.01); *B65G 47/647* (2013.01)

(58) Field of Classification Search
CPC .... B65G 47/645; B65G 39/12; B65G 41/002; B65G 45/12; B65G 15/24; B65G 47/647
See application file for complete search history.

(56) References Cited

U.S. PATENT DOCUMENTS 4,130,193 A * 12/1978 Bourgeois .......... B65G 47/8823
198/457.03
4,424,966 A * 1/1984 Chandhoke ............ B65G 21/14
271/189
(Continued)

FOREIGN PATENT DOCUMENTS

| EP | 1012086 B1 | 12/2001 |
| EP | 2019803 B1 | 7/2014 |
| WO | 2014178784 A1 | 11/2014 |

OTHER PUBLICATIONS

European Patent Office Search Report for Related Application No. 22174912.0 dated Oct. 24, 2022 (18 pages, including an English translation).
German Patent Office Action for Application No. 102021113902.3 dated Jan. 28, 2022 (10 pages including English translation).

*Primary Examiner* — Mark A Deuble
(74) *Attorney, Agent, or Firm* — Michael Best & Friedrich LLP

(57) ABSTRACT

A transport device for conveying products (12), in particular packaged and/or non-packaged food, comprises at least one transport unit (14) which comprises at least one endless transport element (16), in particular an endless conveyor belt, which has a product support surface (18) for receiving products (12) to be conveyed, the transport device further comprising at least one guide unit (20) for guiding the transport element (16) and which has at least one, in particular movably supported, guide element (22), in particular a guide roller, and comprising at least one bearing unit (24) for pivotable or tiltable support of the guide unit (20) together with the transport unit (14) relative to a frame unit (26) of a production installation, in particular around a movement axis (30) of the guide unit (20), running at least essentially parallel to the product support surface (18), wherein the guide unit (20) has at least one further guide (Continued)

element (32) for guiding, in particular deflecting, an endless further transport element (34), in particular an endless further conveyor belt, wherein for the purpose of guiding the transport element (16) the further guide element (32) is supported by means of the bearing unit (24) so that it can be pivoted or tilted together with the guide element (22) and with the transport unit (14) relative to the frame unit (26).

14 Claims, 9 Drawing Sheets

(51) Int. Cl.
*B65G 39/12* (2006.01)
*B65G 41/00* (2006.01)
*B65G 45/12* (2006.01)

(56) References Cited

U.S. PATENT DOCUMENTS

| | | | |
|---|---|---|---|
| 4,431,104 A * | 2/1984 | Orlowski | B65G 47/647 |
| | | | 198/431 |
| 4,821,870 A | 4/1989 | Simelunas et al. | |
| 5,078,255 A | 1/1992 | Haley | |
| 5,715,930 A | 2/1998 | Hogenkamp | |
| 5,810,149 A * | 9/1998 | Sandberg | B65G 47/71 |
| | | | 198/369.2 |
| 6,550,603 B1 * | 4/2003 | Beach | B07C 3/065 |
| | | | 198/370.1 |
| 7,461,043 B2 * | 12/2008 | Hess | G06F 9/44505 |
| | | | 715/764 |
| 2002/0104736 A1 * | 8/2002 | Peppel | B65G 47/647 |
| | | | 198/861.5 |
| 2002/0189921 A1 * | 12/2002 | Cinotti | B65B 35/50 |
| | | | 414/794.7 |

\* cited by examiner

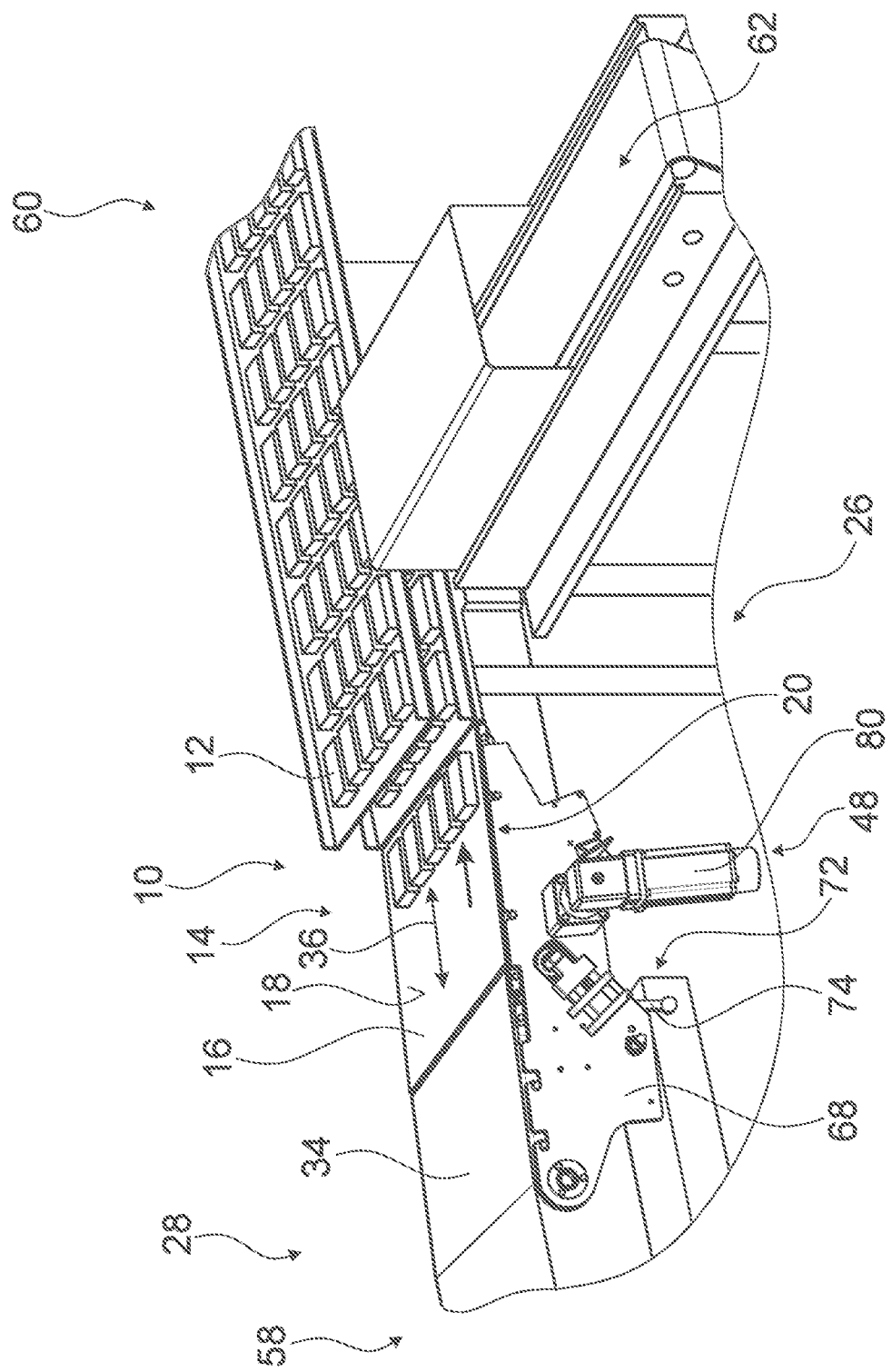

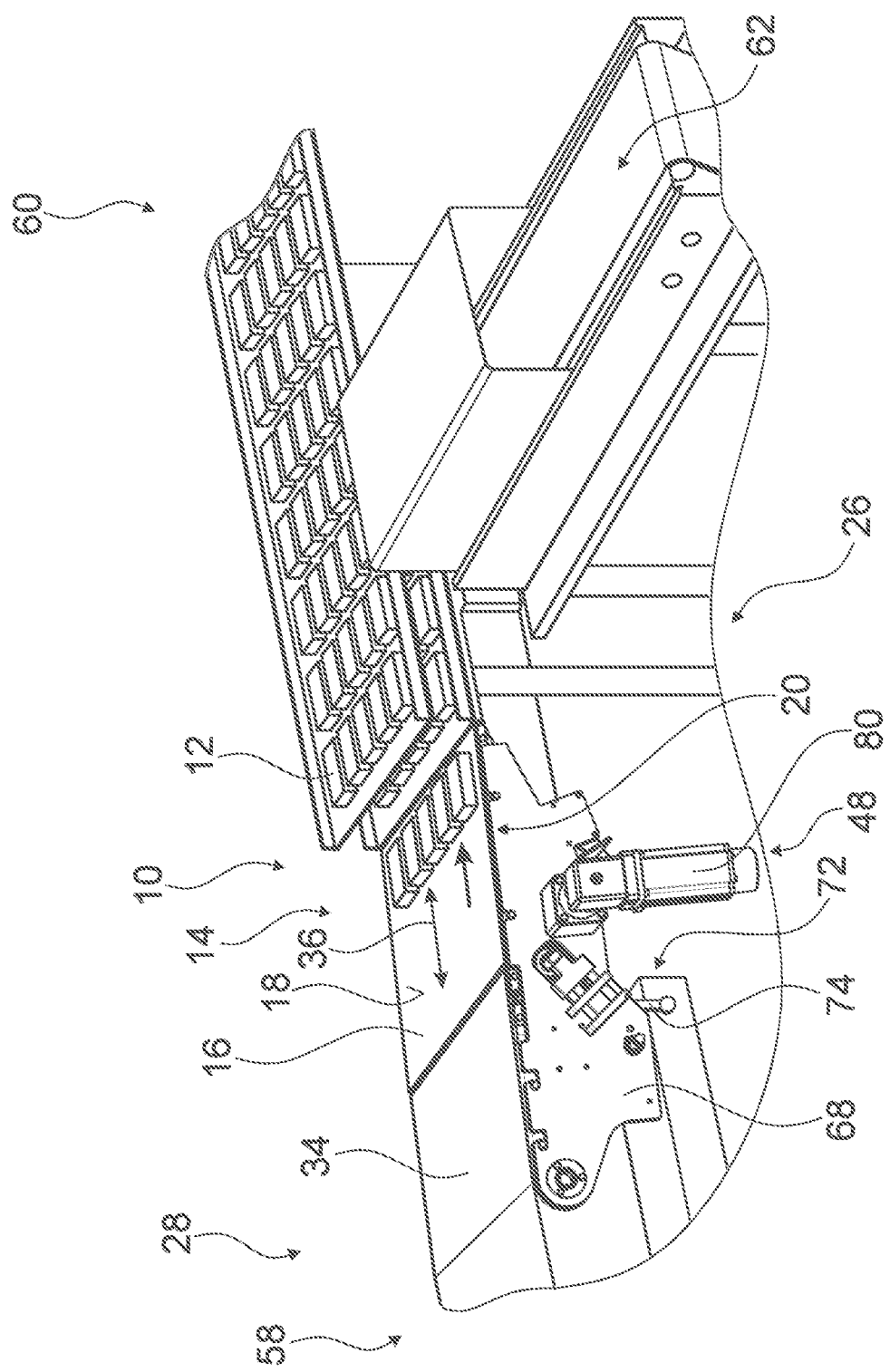

TRANSPORT DEVICE FOR CONVEYING PRODUCTS, IN PARTICULAR PACKAGED AND NON-PACKAGED FOOD, AND PRODUCTION INSTALLATION AND METHOD WITH SUCH A TRANSPORT DEVICE FOR CONVEYING PRODUCTS

CROSS REFERENCE TO RELATED APPLICATION

The present application is based on and incorporates herein by reference the German patent application DE 10 2021 113 902.3 filed on May 28, 2021.

BACKGROUND

Transport devices for conveying products are already known from EP 1 012 086 B1, EP 2 019 803 B1, and U.S. Pat. No. 5,078,255 A, wherein the known transport devices comprise at least one transport unit which comprises at least one endless transport element which has a product support surface for receiving products to be conveyed, at least one guide unit for guiding the transport element and which has at least one guide element, and at least one bearing unit for pivotable or tiltable supporting of the guide unit together with the transport unit relative to a frame unit of a production installation.

SUMMARY

The invention is based on a transport device for conveying products, in particular packaged and/or non-packaged food, with at least one transport unit which comprises at least one endless transport element, in particular an endless conveyor belt, which has a product support surface for receiving products to be conveyed, with at least one guide unit for guiding the transport element and which has at least one in particular movably supported guide element, in particular a guide roller, and with at least one bearing unit for pivotable or tiltable support of the guide unit together with the transport unit relative to a frame unit of a production installation, in particular around a movement axis of the guide unit, running at least essentially parallel to the product support surface.

It is proposed that the guide unit has at least one further guide element for guiding, in particular deflecting, an endless further transport element, in particular an endless further conveyor belt, wherein the further guide element is supported by means of the bearing unit so that it can be pivoted or tilted together with the guide element and with the transport unit relative to the frame unit. The further guide element is preferably arranged on the guide unit spaced apart from the transport element and to the guide element. The further guide element is preferably arranged on the guide unit so that there is no contact with the transport element. The further guide element in particular has no direct contact with the transport element. It is conceivable that the guide unit has multiple guide elements and/or multiple further guide elements which can be arranged uniformly distributed over a maximum width of the guide unit. For example, multiple guide elements can be arranged uniformly distributed over a maximum width of the guide unit and/or multiple further guide elements can be arranged uniformly distributed over a maximum width of the guide unit. For example, multiple guide elements are arranged in a row in a direction running transversely, in particular at least essentially perpendicularly, to a main transport direction of the transport unit. For example, multiple further guide elements are arranged in a row in a direction running transversely, in particular at least essentially perpendicularly, to the main transport direction of the transport unit. It is intended that the phrase "essentially perpendicularly" here defines in particular an orientation of a direction relative to a reference direction, wherein the direction and the reference direction, in particular viewed in a projection plane, enclose an angle of 90° and the angle has a maximum variance of in particular less than 8°, advantageously less than 5°, and particularly advantageously less than 2°. The direction running at least essentially perpendicularly to the main transport direction of the transport unit preferably runs at least essentially parallel to the product support surface and/or to the movement axis. "Essentially parallel" is here to be understood to mean in particular an orientation of a direction relative to a reference direction, in particular within a plane, wherein the direction relative to the reference direction has a variance which is in particular less than 8°, advantageously less than 5°, and particularly advantageously less than 2°. It is also conceivable that the guide unit has a single guide element and/or a single further guide element which extend/extends at least essentially completely over the maximum width of the guide unit in particular in the direction running at least essentially perpendicularly to the main transport direction. The guide element and/or the further guide element are/is preferably designed as a deflection roller or deflection rollers, a guide roller or guide rollers, or the like. The guide element and/or the further guide element are/is supported so that they/it can move, in particular so that they/it can rotate.

The guide unit preferably has at least two side parts, between which the guide element/elements and/or the further guide element/elements are arranged. The guide element/elements and/or the further guide element/elements are preferably arranged in particular directly on the side parts, in particular supported rotatably thereon. The side parts of the guide unit are preferably supported by means of the bearing unit so that they can be pivoted or tilted relative to the frame unit. The side parts are preferably configured for the arrangement and/or support of components of the guide unit. The side parts are in particular designed as sheet-metal parts which delimit the guide unit laterally. "Configured" is in particular to mean specifically designed, specifically configured, and/or specifically equipped. The fact that an object is configured for a specific function is in particular to be understood to mean that the object fulfills and/or performs this specific function in at least one application and/or operating state.

The transport element is preferably designed as an endless conveyor belt. The transport element is preferably arranged on the guide unit so that it can be driven in a circulating fashion. The guide unit is preferably configured for movable support of the transport element. The transport element is preferably designed as a conveyor belt which is integrated into the transport device and is designed separately from the further conveyor belts of a main transport unit of a production installation comprising the transport device. The further transport element is preferably part of the main transport unit of the production installation comprising the transport device. The further transport element is designed in particular as an endless conveyor belt. The further transport element can preferably be driven in a circulating fashion. At least one deflection region of the further transport element is preferably arranged on the guide unit. The deflection region of the further transport element is preferably formed by a region of the further transport element in which the further transport element can be deflected by means of the further guide element in such a way that the further transport element can be deflected, in particular is deflected, by an angle of more than 90°, and preferably executes a change in direction with reference to the main transport direction, in particular is moved counter to the main transport direction after deflection. A further region of the further transport element is arranged, in particular supported, on a further guide unit of the production installation comprising the transport device. The deflection region of the further transport element is preferably supported by means of the bearing unit so that it can be pivoted or tilted relative to the frame unit, whilst the further region of the further transport element remains unpivoted or untilted. The further region of the further transport element preferably forms the majority of the further transport element, in particular more than 50%, preferably more than 70%, and particularly preferably more than 80% of a maximum longitudinal extent of the further transport element when the further transport element is arranged on the further guide unit. The guide unit of the transport device is preferably supported by means of the bearing unit so that it can be pivoted or tilted together with the transport unit of the transport device relative to the further guide unit of the production installation, in particular around the movement axis, running at least essentially parallel to the product support surface, of the guide unit.

The movement axis of the guide unit is preferably defined by an in particular physical supporting axle, a supporting bolt, a supporting shaft, a supporting bush, or the like of the bearing unit. In particular, the supporting axle, the supporting bolt, the supporting shaft, the supporting bush, or the like is arranged on the side parts of the guide unit, in particular is fastened thereon. The bearing unit preferably interacts with a matching part of the production installation which is arranged on the further guide unit of the production installation, in particular is fastened thereto, and is designed so that it corresponds to the supporting axle, the supporting bolt, the supporting shaft, the supporting bush, or the like, in particular in order to effect a movable support of the transport device on the further guide unit of the production installation. The movement axis of the guide unit is preferably arranged at an end of the guide unit, in particular of the side parts, which is remote from a further end of the guide unit, in particular of the side parts, at which the transport element is deflected at an end region remote from the further transport element. The movement axis of the guide unit preferably runs at least essentially parallel to the product support surface.

The product support surface is preferably a surface of the transport element which extends, in particular in a continuously plane fashion, between two deflection rollers of the transport element. The product support surface is preferably arranged on a side of the transport element which is remote from the guide unit. The product support surface preferably forms a top side of the transport element, in particular part of a top side of the transport element, in particular part of a top side of the transport device. By virtue of the pivotable or tiltable support of the guide unit together with the transport unit by means of the bearing unit, an angle of inclination enclosed by the product support surface and a horizontal plane can advantageously be varied. The angle of inclination can preferably be varied from 0°, in particular from a horizontal orientation of the product support surface, up to in particular a maximum of 60°, preferably a maximum of 45°, and very preferably a maximum of 20°.

A compact switch in the field of conveying technology, in particular product handling, can advantageously be obtained by the embodiment according to the invention, in particular for transferring or receiving products to or from buffers and/or discharge conveyor belts arranged vertically at different levels. A switch with a small maximum total longitudinal extent can advantageously be achieved. Low stress on the transport element during a pivoting or tilting movement can advantageously be enabled, in particular because the whole transport element can be pivoted or tilted together with the guide unit associated with the transport element. Because the further transport element, in particular the deflection region of the further transport element, is partially moved at the same time, it is advantageously possible to transfer products between the transport element and the further transport element so that they are handled carefully. It is advantageously possible to quickly receive products from a buffer and then to transfer the products to a discharge conveyor belt, in particular because quick pivoting or tilting movements can be effected by virtue of the compact design of the transport device.

It is furthermore proposed that a maximum longitudinal extent of the transport section of the transport element that can be pivoted or tilted by means of the bearing unit, which maximum longitudinal extent runs at least essentially parallel to an, in particular the abovementioned, main transport direction of the transport unit and in particular extends in a direction running at least essentially parallel to the product support surface, is less than 750 mm. The maximum longitudinal extent of the transport section of the transport element is in particular less than 700 mm, preferably less than 600 mm, and particularly preferably less than 500 mm. Very particularly preferably, the maximum longitudinal extent of the transport section of the transport element has a value from a value range of 350 mm to 450 mm. The transport section of the transport element preferably forms the product support surface. The product support surface is preferably defined by the maximum longitudinal extent of the transport section and by a maximum transverse extent, in particular a maximum width, of the transport section. The maximum transverse extent, in particular the maximum width, of the transport section extends at least essentially perpendicularly to the main transport direction and/or at least essentially parallel to the movement axis. It is conceivable that the transport device for the solution according to the invention is designed in an alternative embodiment in such a way that the guide unit is designed to guide, in particular to deflect, the endless further transport element independently of the further guide element. In the alternative embodiment, in particular in the embodiment of the guide unit which is designed independently of the further guide element, the transport device preferably comprises at least one transport unit which comprises at least one endless transport element, in particular an endless conveyor belt, which has a product support surface for receiving products to be conveyed, at least one guide unit for guiding the transport element and which has at least one in particular movably supported guide element, in particular a guide roller, and at least one bearing unit for pivotable or tiltable support of the guide unit together with the transport unit relative to a frame unit of a production installation, in particular around a movement axis, running at least essentially parallel to the product support surface, of the guide unit, wherein a maximum longitudinal extent, which runs at least essentially parallel to a main transport direction of the transport unit and in particular extends in a direction running at least essentially parallel to the product support surface, of a transport section of the transport element, which can be pivoted or tilted by means of the bearing unit, is less than 750 mm. A compact switch in the field of conveying technology, in particular product handling, can advantageously be obtained by the embodiment according to the invention, in particular for transferring or receiving products to or from buffers and/or discharge conveyor belts arranged vertically at different levels. A switch with a small maximum total longitudinal extent can advantageously be achieved. Low stress on the transport element during a pivoting or tilting movement can advantageously be enabled, in particular because the whole transport element can be pivoted or tilted together with the guide unit associated with the transport element. The whole product support surface of the transport element can advantageously be pivoted or tilted in particular in order to enable the transfer or receipt of products to or from buffers and/or discharge conveyor belts arranged vertically at different levels.

It is moreover proposed that the at least one further guide element is arranged in a proximity of one end of the guide unit at which the movement axis of the guide unit is arranged. The close region of the guide unit preferably extends from one end of the guide unit to no further than the center of the guide unit, in particular viewed in the main transport direction. The center of the guide unit preferably has, in the main transport direction, a maximum spacing from the end of the guide unit which corresponds to 50% of a maximum longitudinal extent of the guide unit. The center of the guide unit preferably has, in the main transport direction, a maximum spacing from the further end of the guide unit which corresponds to 50% of a maximum longitudinal extent of the guide unit. In particular, the center of the guide unit is equally spaced from the end and the further end of the guide unit. A particularly compact embodiment of the transport device with a space-saving arrangement of the further guide element can advantageously be obtained by the embodiment according to the invention. Low stress on the further transport element can advantageously be obtained in the case of a pivoting movement or tilting movement of the guide unit, in particular because the further transport element extends into the guide unit only with the deflection region. A compact switch in the field of conveying technology, in particular product handling, can advantageously be obtained, in particular for transferring or receiving products to or from buffers and/or discharge conveyor belts arranged vertically at different levels. A switch with a small maximum total longitudinal extent can advantageously be achieved.

It is furthermore proposed that the at least one further guide element is arranged spaced apart from the movement axis of the guide unit and has a maximum spacing, extending in particular in a direction running at least essentially parallel to the product support surface, from the movement axis which is less than 400 mm. The maximum spacing of the further guide element relative to the movement axis in the direction running at least essentially parallel to the product support surface is in particular less than 350 mm, preferably less than 300 mm, and particularly preferably less than 280 mm. The maximum spacing of the further guide element relative to the movement axis in the direction running at least essentially parallel to the product support surface very particularly preferably has a value between 250 mm and 320 mm. The maximum spacing of the further guide element from the movement axis is preferably defined by a spacing between the movement axis and an axis of rotation of the further guide element in the direction running at least essentially parallel to the product support surface. It is, however, also conceivable that the maximum spacing of the further guide element from the movement axis is defined by a spacing between the movement axis and an outer surface, in particular remote from the movement axis, of the further guide element in the direction running at least essentially parallel to the product support surface. A small inclination of the further transport element and hence a low tensile stress in the further transport element during a pivoting movement or a tilting movement of the guide unit can advantageously be achieved by virtue of the embodiment according to the invention. A particularly compact embodiment of the transport device with a space-saving arrangement of the further guide element can advantageously be obtained. Low stress on the further transport element can advantageously be obtained in the case of a pivoting movement or tilting movement of the guide unit, in particular because the further transport element extends into the guide unit only with the deflection region. A compact switch in the field of conveying technology, in particular product handling, can advantageously be obtained, in particular for transferring or receiving products to or from buffers and/or discharge conveyor belts arranged vertically at different levels. A switch with a small maximum total longitudinal extent can advantageously be achieved.

It is furthermore proposed that the transport device comprises at least one drive unit, in particular an electromotor unit, which comprises at least one drive element, in particular a drive roller, for driving, in particular in a circulating fashion, the transport element relative to, in particular around, the guide unit, wherein at least the drive element is arranged on the guide unit and is supported by means of the bearing unit so that it can be pivoted or tilted together with the guide unit and the transport unit relative to the frame unit. The drive element can be driven directly by a motor, in particular by an electromotor, of the drive unit, or the drive element can be driven indirectly, for example via a belt or chain drive of the drive unit. The drive element is preferably designed as a drive roller. In particular, the drive element is arranged between the side parts of the guide unit, preferably supported rotatably on at least one of the side parts. The drive unit is preferably configured for driving the transport element in two opposite directions, in particular directions running at least essentially parallel to the main transport direction. The transport element can preferably be driven by means of the drive unit in a direction away from the further transport element, for example in order to feed the products to a buffer or in order to feed products to a discharge conveyor belt, preferably depending on a pivoted or tilted position of the transport device. The transport element can preferably be driven by means of the drive unit in a direction toward the further transport element, for example in order to transfer the products from the buffer, in particular depending on a pivoted or tilted position of the transport device. To activate the drive unit, the transport device or the production installation comprising the transport device comprises at least one, in particular one, open-loop or closed-loop control unit already known to a person skilled in the art. The transport device preferably comprises at least one tensioning unit which is configured for tensioning the transport element. The tensioning unit preferably has at least one tensioning element, in particular a hydraulic or pneumatic cylinder. The tensioning element is preferably configured to act on a tensioning roller of the tensioning unit, in particular in order to adjust the tension of the transport element. The tensioning element is preferably arranged on the guide unit, in particular fastened thereto and/or supported thereon. The tensioning roller is preferably supported on the guide unit. The tensioning unit as a whole is preferably arranged on the guide unit and is supported by means of the bearing unit so that it can be moved, in particular can be pivoted or tilted, together with the guide unit and the transport unit relative to the frame unit. Reliable driving of the transport element can advantageously be obtained by virtue of the embodiment according to the invention. Direct driving of the transport element on the moving guide unit can advantageously be achieved, as a result of which low stress on the transport element can be achieved, in particular because the tensioning of the transport element during a movement of the guide unit remains largely constant. A compact switch in the field of conveying technology, in particular product handling, can advantageously be obtained, in particular for transferring or receiving products to or from buffers and/or discharge conveyor belts arranged vertically at different levels. A switch with a small maximum total longitudinal extent can advantageously be achieved.

It is additionally proposed that the transport device comprises at least one, in particular the abovementioned drive unit, in particular an electromotor unit, which is arranged completely on the guide unit and is supported by means of the bearing unit so that it can be pivoted or tilted together with the guide unit and the transport unit relative to the frame unit. The drive unit preferably comprises at least the drive element and at least the motor. It is conceivable that the drive unit comprises further elements, for example a gearbox, a belt, or a chain, or other elements that appear appropriate to a person skilled in the art, which are all arranged on the guide unit, in particular fastened thereon and/or supported thereon. The motor of the drive unit is preferably arranged on at least one of the side parts of the guide unit, in particular fastened thereon. The drive unit can be arranged partly on an outer side of the guide unit, partly on an inner side, or completely on an inner side of the guide unit. The drive unit is preferably arranged as a whole on the guide unit and supported by means of the bearing unit so that it can be moved, in particular so that it can be pivoted or tilted, together with the guide unit and the transport unit relative to the frame unit. Multiple components can advantageously be arranged on the moving guide unit by virtue of the embodiment according to the invention. Highly convenient maintenance and servicing can advantageously be obtained because the transport device can be replaced simply. Direct driving of the transport element on the moving guide unit can advantageously be achieved, as a result of which low stress on the transport element can be achieved, in particular because the tensioning of the transport element during a movement of the guide unit remains largely constant. A compact switch in the field of conveying technology, in particular product handling, can advantageously be obtained, in particular for transferring or receiving products to or from buffers and/or discharge conveyor belts arranged vertically at different levels. A switch with a small maximum total longitudinal extent can advantageously be achieved.

It is furthermore proposed that the transport device comprises at least one orienting unit for orienting, in particular centering, the transport element relative to the guide unit, wherein the orienting unit is arranged on the guide unit and is supported by means of the bearing unit so that it can be pivoted or tilted together with the guide unit and the transport unit relative to the frame unit. The orienting unit preferably comprises at least one orienting roller. The orienting roller is preferably arranged on at least one of the side parts of the guide unit, in particular supported thereon. The orienting unit preferably comprises at least one drive, for example a motor, in particular at least one servomotor, hydraulic or pneumatic drive, or the like for moving the orinting roller, in particular in a manner already known to a person skilled in the art. The drive of the orienting unit is preferably arranged on at least one of the side parts of the guide unit, in particular fastened thereon. The orienting unit can preferably be controlled in an open or closed loop by means of an open-loop or closed-loop control unit in a manner already known to a person skilled in the art. The orienting unit can be arranged partly on an outer side of the guide unit, partly on an inner side, or completely on an inner side of the guide unit. The orienting unit is preferably arranged as a whole on the guide unit and supported by means of the bearing unit so that it can be moved, in particular so that it can be pivoted or tilted, together with the guide unit and the transport unit relative to the frame unit. The orienting unit is preferably configured for so-called transport belt control. Correct orientation of the transport element can advantageously be reliably ensured by virtue of the embodiment according to the invention, in particular also during a pivoting movement or tilting movement of the guide unit. Wear of the transport element as a consequence of faulty orientation can advantageously be counteracted. Multiple components can advantageously be arranged on the moving guide unit. Highly convenient maintenance and servicing can advantageously be obtained because the transport device can be replaced simply. A compact switch in the field of conveying technology, in particular product handling, can advantageously be obtained, in particular for transferring or receiving products to or from buffers and/or discharge conveyor belts arranged vertically at different levels. A switch with a small maximum total longitudinal extent can advantageously be achieved.

It is moreover proposed that the transport device comprises at least one wiping unit for wiping remains of conveyed products from the transport element, wherein the wiping unit is arranged on the guide unit and supported by means of the bearing unit so that it can be pivoted or tilted together with the guide unit and the transport unit relative to the frame unit. The wiping unit comprises at least one wiping element, in particular a scraper, which is configured to wipe remains of conveyed products from the transport element. The wiping element is preferably in, in particular permanent, contact with the transport element. The wiping element preferably bears against the transport element in a manner already known to a person skilled in the art, in particular during a circulating movement of the transport element. The wiping unit is preferably arranged as a whole on the guide unit and supported by means of the bearing unit so that it can be moved, in particular so that it can be pivoted or tilted, together with the guide unit and the transport unit relative to the frame unit. Cleaning of the transport element can advantageously be reliably obtained by virtue of the embodiment according to the invention. Multiple components can advantageously be arranged on the moving guide unit. Highly convenient maintenance and servicing can advantageously be obtained because the transport device can be replaced simply. A compact switch in the field of conveying technology, in particular product handling, can advantageously be obtained, in particular for transferring or receiving products to or from buffers and/or discharge conveyor belts arranged vertically at different levels. A switch with a small maximum total longitudinal extent can advantageously be achieved.

The invention additionally proposes a production installation with at least one transport device according to the invention and with at least one, in particular the abovementioned, frame unit, relative to which at least the guide unit is supported by means of the bearing unit so that it can be pivoted or tilted together with the transport unit, in particular around a movement axis of the guide unit, running at least essentially parallel to a standing surface of the frame unit.

The standing surface of the frame unit is preferably formed by one or more surfaces of one or more standing feet of the frame unit. The frame unit is preferably in, in particular direct, contact by means of the standing surface with the ground on which the production installation is arranged. A production installation with a compact switch in the field of conveying technology, in particular product handling, can advantageously be obtained, in particular for transferring or receiving products to or from buffers and/or discharge conveyor belts arranged vertically at different levels. A switch with a small maximum total longitudinal extent can advantageously be achieved. Low stress on the transport element can advantageously be enabled during a pivoting movement or tilting movement, in particular because the whole transport element can be pivoted or tilted together with the guide unit associated with the transport element. Because the further transport element, in particular the deflection region of the further transport element, is partially moved at the same time, it is advantageously possible to transfer products between the transport element and the further transport element so that they are handled carefully.

The invention is moreover based on a method for conveying products, in particular packaged and/or non-packaged food, by means of a transport device, in particular one according to the invention. It is proposed that at least one, in particular the abovementioned, guide element of an, in particular the abovementioned, guide unit of the transport device is pivoted or tilted together with an, in particular the abovementioned, transport element of an, in particular the abovementioned, transport unit of the transport device relative to an, in particular the abovementioned, frame unit of an, in particular the abovementioned, production installation, in particular around the movement axis of the guide unit, running at least essentially parallel to the product support surface, wherein the guide unit has at least one further, in particular the abovementioned further, guide element for guiding, in particular deflecting, an endless further, in particular the abovementioned further, transport element, wherein the further guide element is pivoted or tilted together with the guide element and with the transport unit relative to the frame unit. The products are preferably transferred by means of the main transport unit, in particular by means of the further transport element, to the transport element. The further transport element and the transport element are preferably driven in the same direction, in particular in the direction toward the discharge conveyor belt. The products are preferably transferred to the discharge conveyor belt by means of the transport element, in particular in order to discharge the products. The transport device, in particular the product support surface, is preferably inclined relative to the horizontal plane to discharge the products. Should it not be possible to discharge the products as a result of a product jam or malfunction at the discharge conveyor belt, the transport device, starting from the orientation of the transport device, in particular the product support surface, inclined relative to the horizontal plane, is pivoted or tilted around the movement axis of the guide unit in order to obtain an orientation of the transport device, in particular the product support surface, parallel to the horizontal plane. In the orientation of the transport device, in particular the product support surface, situated parallel to the horizontal plane, the products can be fed to the buffer by means of the transport element, wherein the transport element and the further transport element are driven in the same direction, in particular in the direction toward the buffer. In the orientation of the transport device, in particular the product support surface, situated parallel to the horizontal plane, the products are transferred from the main transport unit, in particular from the further transport element, to the transport element which in turn transfers the products to the buffer, in particular to load the buffer. The transport element, the further transport element, and the buffer are preferably driven in the same direction.

If the product jam or the malfunction is cleared, a refeed preferably takes place, i.e. products are received again from the buffer and the products are then transferred to the discharge conveyor belt. During the refeed, products which are arranged on the buffer are preferably transferred to the transport device, in particular to the transport element, wherein the buffer is driven in a direction toward the transport element and the transport element is driven in a direction toward the further transport element. During the refeed, the transport element and the buffer are preferably moved in an opposite direction to the movement direction of the transport element and the buffer which is followed when loading the buffer. When the products are transferred from the buffer to the transport element, the buffer and the transport element are preferably moved in the opposite direction, which is oriented toward the further transport element. During the refeed, the further transport element can furthermore be driven in the direction of the transport element until products which are being conveyed by means of the further transport element move into a position close to the transport device. Movement of the further transport element is preferably stopped as soon as the products which are being conveyed by means of the further transport element during the refeed move into a position close to the transport device. A monitoring device, for example a light barrier, a camera, or the like, can be provided which monitors a region between the transport device and the further transport element in order to stop movement of the further transport element during a refeed. After the products have been transferred from the buffer to the transport element during a refeed, a pivoting or tilting movement of the transport device, in particular the transport element, is effected around the movement axis of the guide unit in order to orient the transport device, in particular the product support surface, so that it is again inclined relative to the horizontal plane. The deflection region of the further transport element is preferably supported by means of the bearing unit so that it can be pivoted or tilted together with the guide unit and the transport unit relative to the frame unit, whilst the further region of the further transport element remains unpivoted or untilted. As soon as the pivoting or tilting movement of the transport device, in particular the transport element, has finished, the transport element is driven in the direction toward the discharge conveyor belt and the products are transferred from the transport element to the discharge conveyor belt. The further transport element is preferably driven again in the direction toward the transport element in order to transfer the products to the transport element which in turn transfers the products to the discharge conveyor belt. The running direction of the transport element can advantageously be changed such that the transport element and the further transport element van be moved in opposite running directions. Further steps of the method according to the invention can preferably be interpreted for the method in a similar fashion to the description of an embodiment and/or mode of functioning of the transport device and/or the production installation. By virtue of the embodiment according to the invention, an advantageous method for transferring or receiving products to or from buffers and/or discharge conveyor belts arranged vertically at different levels can be obtained which enables operation in which material and products can advantageously be handled carefully. Low stress on the transport element can advantageously be enabled during a pivoting movement or tilting movement, in particular because the whole transport element can be pivoted or tilted together with the guide unit associated with the transport element.

The transport device according to the invention, the production installation according to the invention, and/or the method according to the invention are/is not to be restricted here to the abovedescribed application and embodiment. In particular, the transport device according to the invention, the production installation according to the invention, and/or the method according to the invention for implementing a mode of functioning described herein can have a different number of individual elements, components, and units and method steps from the number stated herein. In addition, in the case of the value ranges stated in this document, values which lie within the said limits are also to be considered as disclosed and capable of being used as desired.

BRIEF DESCRIPTION OF THE DRAWINGS

Further advantages emerge from the following description of the drawings. An exemplary embodiment of the invention is illustrated in the drawings. The drawings, the description, and the claims contain numerous features in combination. A person skilled in the art will expediently also consider the features individually and bring them together to form meaningful other combinations.

In the drawings:

FIG. 6a shows a detailed view of the production installation according to the invention in discharge mode, in which products are fed to a discharge conveyor belt, in a schematic representation, FIG. 6d shows a detailed view of the production installation according to the invention in discharge mode, after refeed, in a schematic representation.

DETAILED DESCRIPTION

Figure 1:
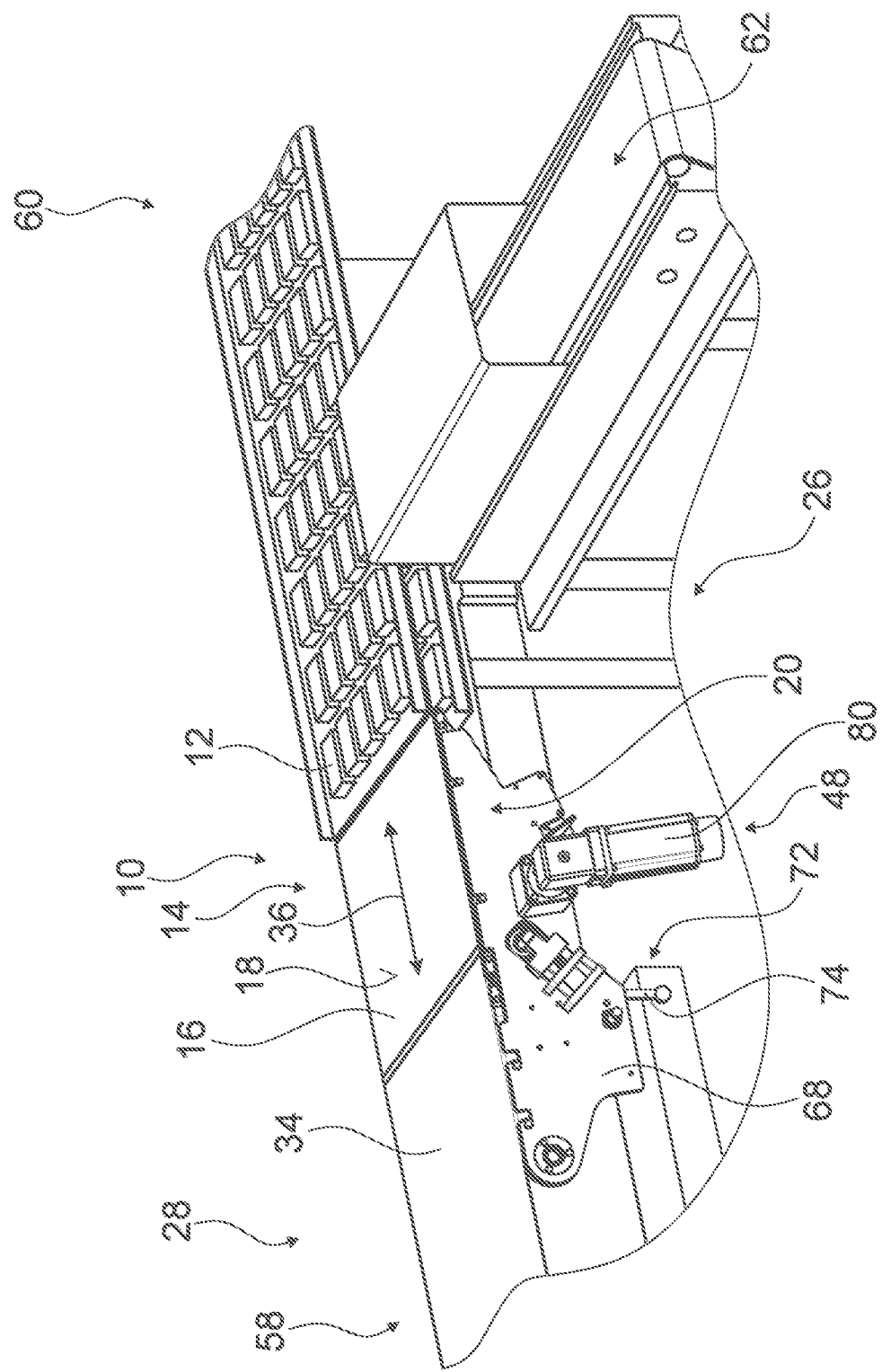
FIG. 1 shows a partial view of a production installation according to the invention with a frame unit and with a transport device according to the invention in a schematic representation.
Figure 3:
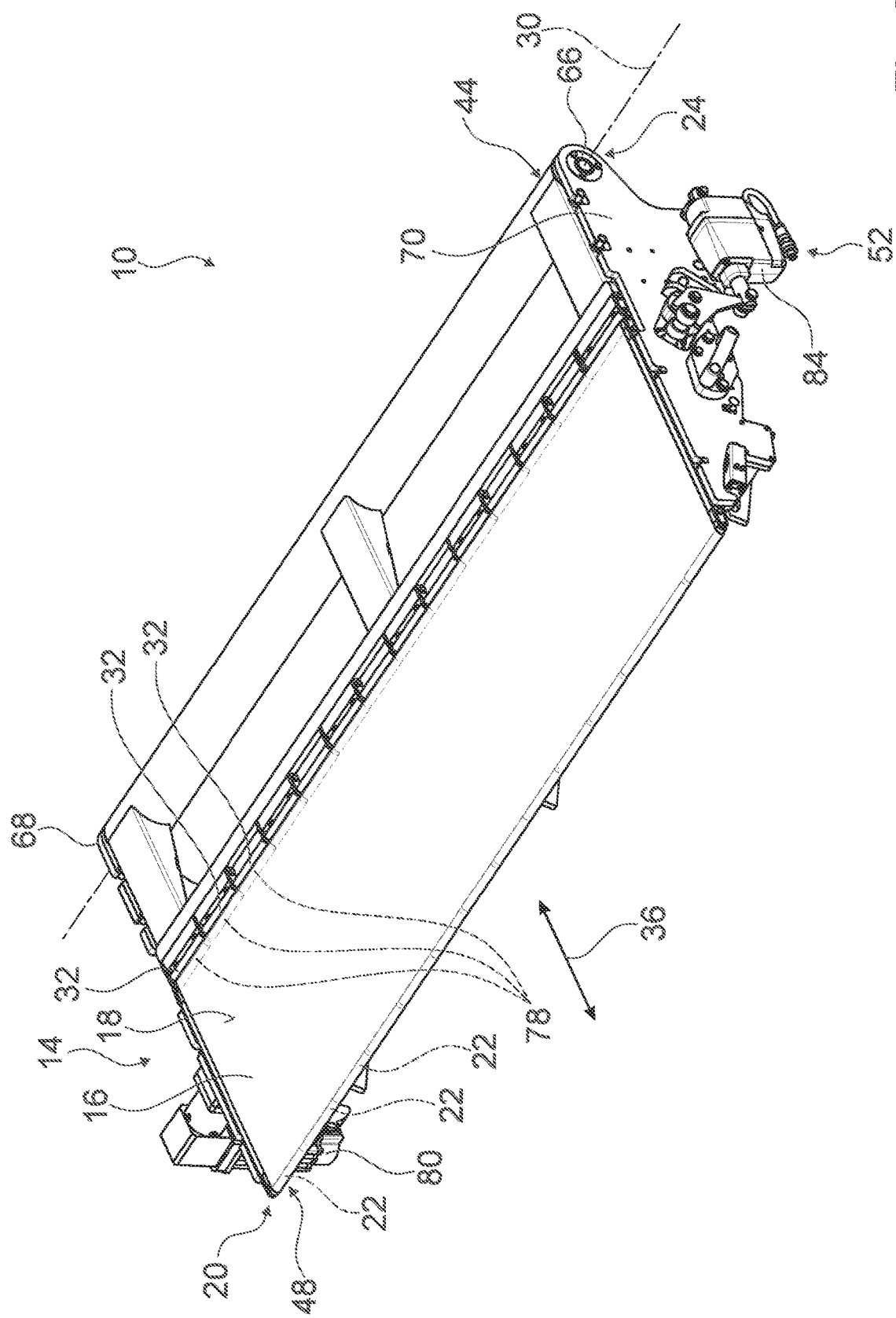
FIG. 3 shows a further detailed view of the transport device according to the invention in a schematic representation.
Figure 4:
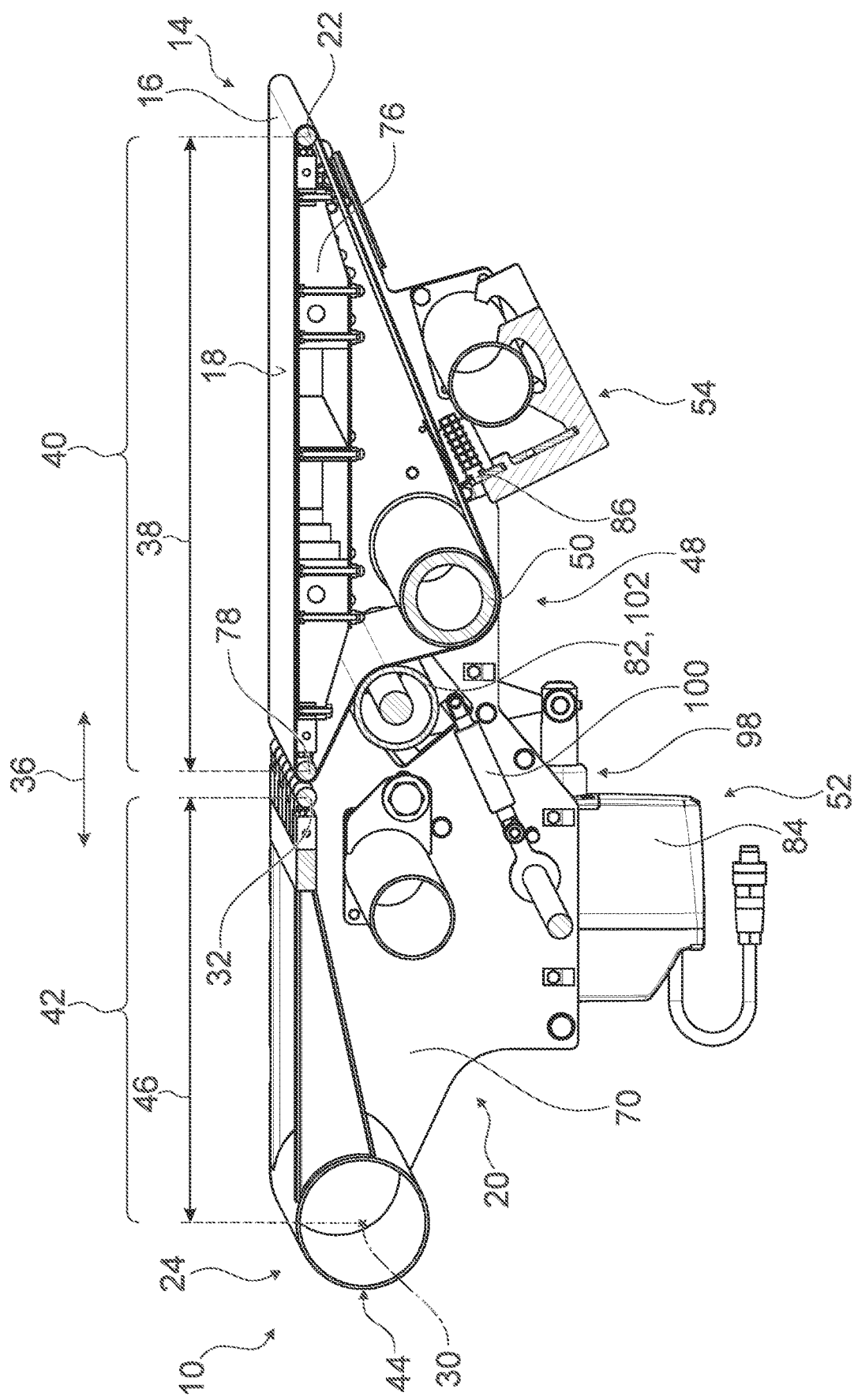
FIG. 4 shows a view in section of the transport device according to the invention in a schematic representation.

FIG. 1 shows a production installation 28 which is designed, for example, as a food packaging installation and/or food production installation. The production installation 28 comprises at least one transport device 10 for conveying products 12, in particular packaged and/or non-packaged food, and at least one frame unit 26, relative to which at least one guide unit 20 of the transport device 10 is supported so that it can be pivoted or tilted together with a transport unit 14 of the transport device 10 by means of a bearing unit 24 (cf FIGS. 2 to 4) of the transport device 10, in particular around a movement axis 30 (cf FIGS. 2 to 4), running at least essentially parallel to a standing surface of the frame unit 26, of the guide unit 20.

The production installation 28 preferably comprises a main transport unit 58 by means of which products 12, which are, for example, manufactured by means of a manufacturing unit (not illustrated in detail here) of the production installation 28, can be conveyed in a manner already known to a person skilled in the art to further units, for example packaging and/or sorting units (not illustrated in detail here) of the production installation 28. The main transport unit 58 preferably comprises a buffer 60 which is configured to temporarily store products 12 for onward transport. The main transport unit 58 moreover comprises at least one discharge conveyor belt 62 by means of which products 12 can be discharged, in particular can be fed to further units of the production installation 28. The transport device 10 is preferably integrated into the main transport unit 58 or at least arranged thereon, in particular in the region of the buffer 60 and/or the discharge conveyor belt 62.

Figure 2:
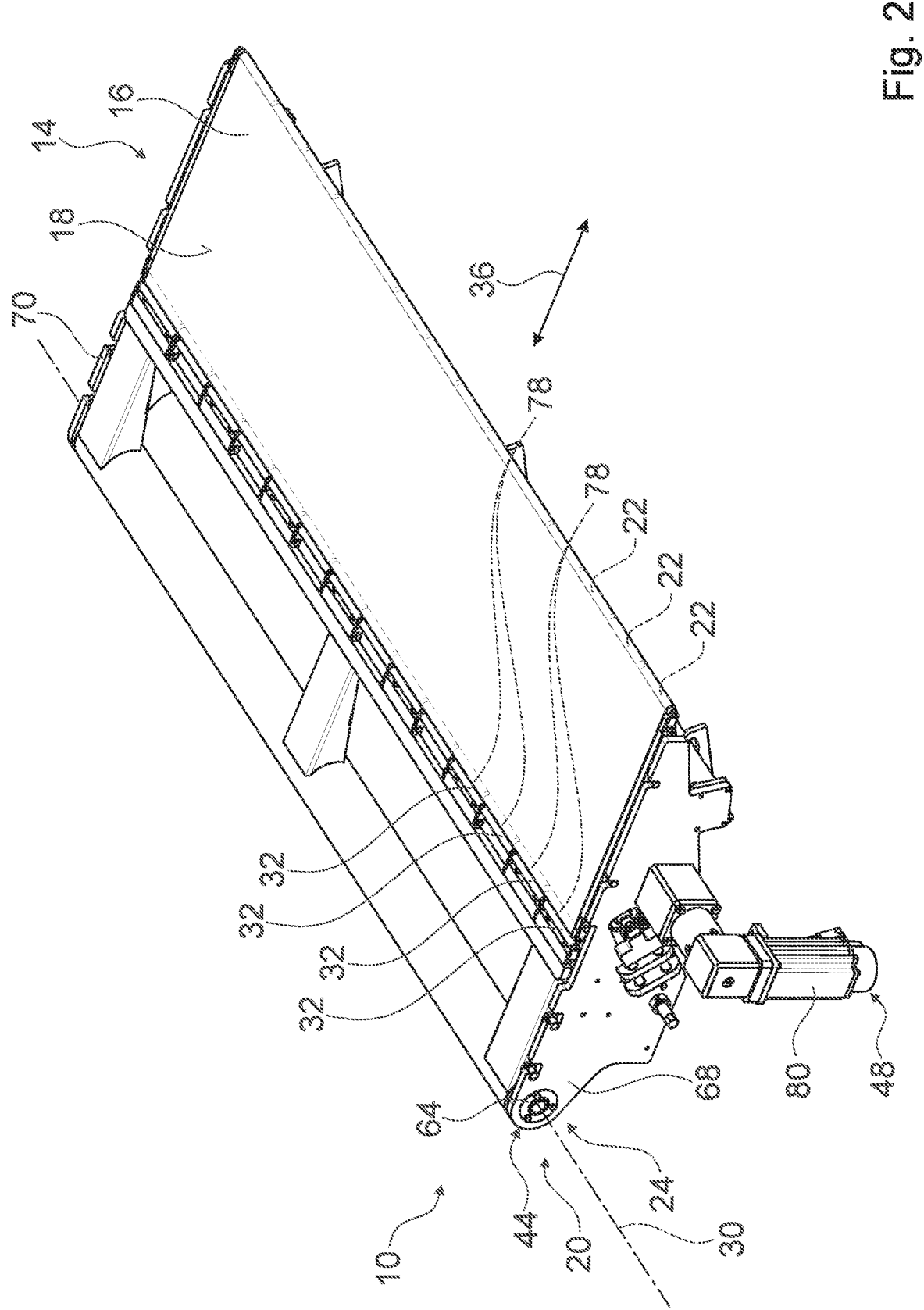
FIG. 2 shows a detailed view of the transport device according to the invention in a schematic representation.

FIG. 2 shows a detailed view of the transport device 10. The transport device 10 for conveying products 12, in particular packaged and/or non-packaged food, comprises at least the transport unit 14 which comprises at least one endless transport element 16, in particular an endless conveyor belt, which has a product support surface 18 for receiving products 12 to be conveyed, at least the guide unit 20 for guiding the transport element 16 which has at least one, in particular movably supported, guide element 22, in particular a guide roller, and at least the bearing unit 24 for pivotable or tiltable support of the guide unit 20 together with the transport unit 14 relative to the frame unit 26 of the production installation 28, in particular around the movement axis 30, running at least essentially parallel to the product support surface 18, of the guide unit 20. The guide unit 20 preferably has at least two side parts 68, 70 at the ends 44 of which the bearing unit 24 is arranged. The movement axis 30 of the guide unit 20 is preferably defined by an in particular physical supporting axle, a supporting bolt, a supporting shaft, a supporting bush, or the like of the bearing unit 24. In the exemplary embodiment illustrated in FIGS. 2 to 4, the movement axis 30 of the guide unit 20 is defined by two supporting bushes 64, 66 (cf FIGS. 2 and 3). The supporting bushes 64, 66 are arranged on two averted sides of the guide unit 20 (cf FIGS. 2 and 3). In particular, one supporting bush 64, 66 is provided per side part 68, 70. The supporting bushes 64, 66 are configured for interacting with supporting bolts (not illustrated in detail here), of the main transport unit 58 or the frame unit 26, which are arranged on the frame unit 26 or on the main transport unit 58. The supporting bolts preferably engage in the supporting bushes 64, 66 in order to support the guide unit 20, in particular the whole transport device 10, so that it can be pivoted or tilted relative to the frame unit 26 around the movement axis 30. It is, however, also conceivable that the bearing unit 24 has a different embodiment which appears appropriate to a person skilled in the art, by means of which the guide unit 20 is supported so that it can be pivoted or tilted around the movement axis 30.

The guide unit 20 comprises at least one further guide element 32 for guiding, in particular deflecting, an endless further transport element 34 (cf FIG. 1), in particular of the main transport unit 58, wherein the further guide element 32 is supported by means of the bearing unit 24 so that so that it can be pivoted or tilted together with the guide element 22 for guiding the transport element 16 and with the transport unit 14 relative to the frame unit 26. The further transport element 34 is preferably part of the main transport unit 58 of the production installation 28 comprising the transport device 10. The further transport element 34 is preferably designed as an endless conveyor belt. The further transport element 34 can preferably be driven in a circulating fashion. At least one deflection region of the further transport element 34 is preferably arranged on the guide unit 20. The deflection region of the further transport element 34 is preferably formed by a region of the further transport element 34 in which the further transport element 34 can be deflected by means of the further guide element 32 in such a way that the further transport element 34 can be, in particular is, deflected by an angle of more than 90° and preferably executes a change in direction with reference to the main transport direction 36, in particular is moved counter to the main transport direction after deflection. A further region of the further transport element 34 is arranged, in particular supported, on a further guide unit (not illustrated in detail here) of the production installation 28 comprising the transport device 10. The further guide unit is preferably a part of the main transport unit 58 or the frame unit 26. The deflection region of the further transport element 34 is preferably supported by means of the bearing unit 24 so that it can be pivoted or tilted relative to the frame unit 26, whilst the further region of the further transport element 34 remains unpivoted or untilted.

The guide unit 20 preferably has multiple guide elements 22 and/or multiple further guide elements 32 which can be arranged uniformly distributed over a maximum width of the guide unit 20. For example, multiple guide elements 22 can be arranged uniformly distributed over a maximum width of the guide unit 20 and/or multiple further guide elements 32 can be arranged uniformly distributed over a maximum width of the guide unit 20 (cf FIGS. 2 and 3). For example, multiple guide elements 22 are arranged in a row in a direction running transversely, in particular at least essentially perpendicularly, to a main transport direction 36 of the transport unit 14. For example, multiple further guide elements 32 are arranged in a row in a direction running transversely, in particular at least essentially perpendicularly, to the main transport direction 36 of the transport unit 14. The guide element/elements 22 and/or the further guide element/elements 32 are/is preferably arranged between the side parts 68, 70. The side parts 68, 70 of the guide unit 20 are preferably supported by means of the bearing unit 24 so that they can be pivoted or tilted relative to the frame unit 26. The side parts 68, 70 are preferably configured for the arrangement and/or support of components of the guide unit 20. The side parts are in particular designed as sheet-metal parts which delimit the guide unit laterally.

The at least one further guide element 32 is arranged in a proximity 42 of the end 44 of the guide unit 20 at which the movement axis 30 of the guide unit 20 is arranged. The at least one further guide element 32 is arranged spaced apart from the movement axis 30 of the guide unit 20 and has a maximum spacing 46 (cf FIG. 4), extending in particular in a direction running at least essentially parallel to the product support surface 18, from the movement axis 30 which is less than 400 mm. The maximum spacing 46 of the further guide element 32 relative to the movement axis 30 in the direction running at least essentially parallel to the product support surface 18 is in particular less than 350 mm, preferably less than 300 mm, and particularly preferably less than 280 mm. The maximum spacing 46 of the further guide element 32 relative to the movement axis 30 in the direction running at least essentially parallel to the product support surface 18 very particularly preferably has a value between 250 mm and 320 mm.

The guide unit 20 moreover comprises in particular at least one part-load track 76 which is arranged between the side parts 68, 70 and is configured to support the transport element 16, in particular to counteract sagging of the transport element 16 in the event of a high load from a large mass of products 12. The part-load track 76 is manufactured from a hollow-chamber profile (cf FIG. 4). The guide element/elements 22 is/are preferably rotatably supported on the part-load track 76. The guide unit 20 has at least one additional guide element 78 which is rotatably supported on the part-load track 76 and is configured for guiding the transport element 16. The guide unit 20 preferably comprises multiple additional guide elements 78 which are designed in a similar fashion to the guide element 22 and/or are arranged on the guide unit 20. The guide element/elements 22 is/are, viewed in the main transport direction 36, preferably arranged on a side of the part-load track 76 which is remote from a further side of the part-load track 76 at which the additional guide element/elements 78 is/are arranged on the part-load track 76. The product support surface 18 of the transport element 16 is arranged in particular in the region of the part-load track 76.

The transport element 16 preferably has a transport section 40 (cf FIG. 4) which can be pivoted or tilted by means of the bearing unit 24 and which has a maximum longitudinal extent 38, which runs at least essentially parallel to the main transport direction 36 of the transport unit 14 and in particular extends in a direction running at least essentially parallel to the product support surface 18, which is less than 750 mm. The maximum longitudinal extent 38 of the transport section 40 of the transport element 16 is in particular less than 700 mm, preferably less than 600 mm, and particularly preferably less than 500 mm. Very particularly preferably, the maximum longitudinal extent 38 of the transport section 40 of the transport element 16 has a value from a value range of 350 mm to 450 mm. The transport section 40 of the transport element 16 preferably forms the product support surface 18. The product support surface 18 is preferably defined by the maximum longitudinal extent 38 of the transport section 40 and by a maximum transverse extent, in particular a maximum width, of the transport section 40.

The transport device 10 comprises at least one drive unit 48, in particular an electromotor unit, which comprises at least one drive element 50, in particular a drive roller, for driving, in particular in a circulating fashion, the transport element 16 relative to, in particular around, the guide unit 20, wherein at least the drive element 50 is arranged on the guide unit 20 and is supported by means of the bearing unit 24 so that it can be pivoted or tilted together with the guide unit 20 and the transport unit 14 relative to the frame unit 26. The drive element 50 can be driven directly by a motor 80, in particular by an electromotor, of the drive unit 48, or the drive element 50 can be driven indirectly, for example via a belt or chain drive of the drive unit 48. The drive element 50 is preferably designed as a drive roller. In particular, the drive element 50 is arranged between the side parts 68, 70 of the guide unit 20, preferably supported rotatably on at least one of the side parts 68, 70.

The transport device 10 comprises at least the drive unit 48, which is arranged completely on the guide unit 20 and is supported by means of the bearing unit 24 so that it can be pivoted or tilted together with the guide unit 20 and the transport unit 14 relative to the frame unit 26. The motor 80 of the drive unit 48 is preferably arranged on at least one of the side parts 68, 70 of the guide unit 20, in particular fastened thereon. The drive unit 48 can be arranged partly on an outer side of the guide unit 20, partly on an inner side, or completely on an inner side of the guide unit 20. The drive unit 48 is preferably arranged as a whole on the guide unit 20 and supported by means of the bearing unit 24 so that it can be moved, in particular so that it can be pivoted or tilted, together with the guide unit 20 and the transport unit 14 relative to the frame unit 26.

The transport device 10 comprises at least one orienting unit 52 (cf FIGS. 3 and 4) for orienting, in particular centering, the transport element 16 relative to the guide unit 20, wherein the orienting unit 52 is arranged on the guide unit 20 and supported by means of the bearing unit 24 so that it can be pivoted or tilted together with the guide unit 20 and the transport unit 14 relative to the frame unit 26. The orienting unit 52 preferably comprises at least one orienting roller 82 (cf FIG. 4). The orienting roller 82 is preferably arranged on at least one of the side parts 68, 70 of the guide unit 20, in particular supported thereon. The orienting unit 52 preferably comprises at least one drive 84 (cf FIG. 3), for example a motor, in particular at least one servomotor, hydraulic or pneumatic drive, or the like for moving the orienting roller 82, in particular in a manner already known to a person skilled in the art. The drive 84 is preferably designed as a linear drive. The drive 84 of the orienting unit 52 is preferably arranged on at least one of the side parts 68, 70 of the guide unit 20, in particular fastened thereon. The orienting unit 52 can preferably be controlled in an open or closed loop by means of an open-loop or closed-loop control unit in a manner already known to a person skilled in the art. The orienting unit 52 can be arranged partly on an outer side of the guide unit 20, partly on an inner side, or completely on an inner side of the guide unit 20. The orienting unit 52 is preferably arranged as a whole on the guide unit 20 and supported by means of the bearing unit 24 so that it can be moved, in particular so that it can be pivoted or tilted, together with the guide unit 20 and the transport unit 14 relative to the frame unit 26.

The transport device 10 furthermore comprises at least one tensioning unit 98 which is configured for tensioning the transport element 16. The tensioning unit 98 preferably has at least one tensioning element 100, in particular a hydraulic or pneumatic cylinder. The tensioning element 100 is preferably configured to act on a tensioning roller 102 of the tensioning unit 98, in particular in order to adjust the tension of the transport element 16. The tensioning element 100 is preferably arranged on the guide unit 20, in particular fastened thereto and/or supported thereon. The tensioning roller 102 is preferably supported on the guide unit 20. The tensioning roller 102 is preferably formed by the orienting roller 82. It is, however, also conceivable that the tensioning roller 102 is designed separately from the orienting roller 82 and is additionally arranged on the guide unit 20. The tensioning unit 98 as a whole is preferably arranged on the guide unit 20 and is supported by means of the bearing unit 24 so that it can be moved, in particular can be pivoted or tilted, together with the guide unit 20 and the transport unit 14 relative to the frame unit 26.

The transport device 10 moreover comprises at least one wiping unit 54 (cf FIG. 4) for wiping remains of conveyed products 12 from the transport element 16, wherein the wiping unit 54 is arranged on the guide unit 20 and supported by means of the bearing unit 24 so that it can be pivoted or tilted together with the guide unit 20 and the transport unit 14 relative to the frame unit 26. The wiping unit 54 comprises at least one wiping element 86, in particular a scraper, which is configured to wipe remains of conveyed products 12 from the transport element 16. The wiping element 86 is preferably in, in particular permanent, contact with the transport element 16. The wiping element 86 preferably bears against the transport element 16 in a manner already known to a person skilled in the art, in particular during a circulating movement of the transport element 16. The wiping unit 54 is preferably arranged as a whole on the guide unit 20 and supported by means of the bearing unit 24 so that it can be moved, in particular so that it can be pivoted or tilted, together with the guide unit 20 and the transport unit 14 relative to the frame unit 26.

The transport device 10 or the production installation 28 comprises at least one switch drive unit 72 (cf FIG. 1) for driving a pivoting movement or a tilting movement of the guide unit 20, in particular the transport device 10. The switch drive unit 72 preferably comprises a drive (not illustrated in detail here) which can be designed, for example, as an electromotor, a pneumatic or hydraulic drive, or as a different drive which appears appropriate to a person skilled in the art. The switch drive unit 72 preferably has at least one coupling link 74 (FIG. 1) by means of which the drive is connected in driving fashion to the guide unit 20, in particular the transport device 10. The coupling link 74 is preferably a coupling rod, designed in particular as a hinged drawbar or the like which is connected to the drive via an eccentric element (not illustrated in detail here) of the switch drive unit 72. It is, however, also conceivable that the coupling link 74 is connected to the drive by means of a different transmission element which appears appropriate to a person skilled in the art, in particular in order to transmit a driving force of the drive and move the coupling link 74, which in turn moves the guide unit 20, in particular the transport device 10, around the movement axis 30. To activate the switch drive unit 72, the transport device 10 or the production installation 28 comprising the transport device 10 comprises at least one, in particular one, open-loop or closed-loop control unit (not illustrated in detail here) already known to a person skilled in the art.

Figure 5:
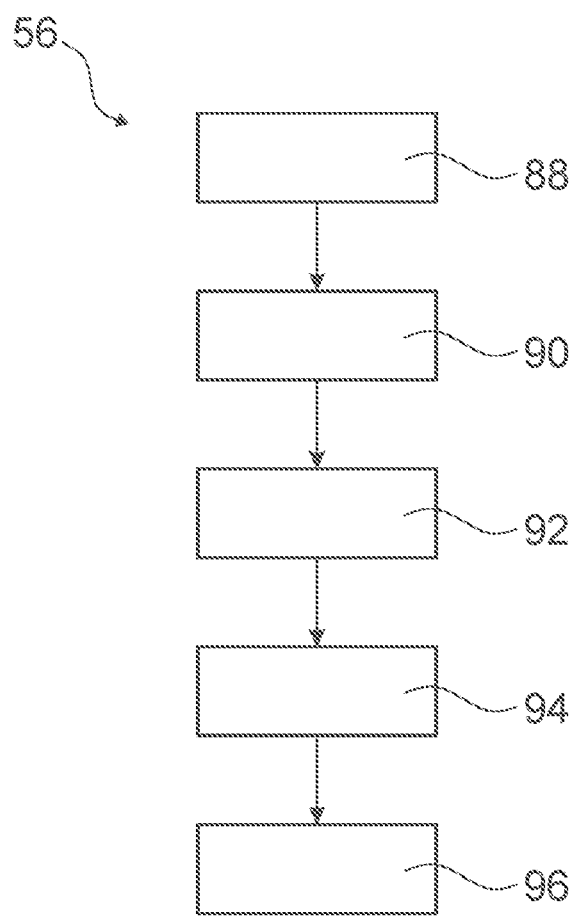
FIG. 5 shows a flow diagram of a method according to the invention for conveying products by means of the transport device according to the invention.

FIG. 5 shows a flow diagram of a method 56 for conveying products 12, in particular packaged and/or non-packaged food, by means of the transport device 10. The products 12 are preferably conveyed in at least one method step 88 from the manufacturing unit or a different unit of the production installation 28 which appears appropriate to a person skilled in the art by means of the main transport unit 58, in particular by means of the further transport element 34, in the main transport direction 36. The products 12 are transferred in at least one method step 90 by the main transport unit 58, in particular by means of the further transport element 34, in the main transport direction 36 to the transport device 10, in particular to the transport element 16. Depending on the possibility for discharge by means of the discharge conveyor belt 62, in at least one method step 90 the transport device 10 is pivoted or tilted around the movement axis 30 in particular in order to transfer the products 12 to the discharge conveyor belt 62. If the discharge conveyor belt 62 is occupied, the products 12 are alternatively transferred, preferably in a method step 92, to the buffer 60 by means of the transport device 10, in particular by means of the transport element 16, in particular with no pivoting movement or tilting movement of the transport device 10. Once the discharge conveyor belt is free again, the products 12 are received from the buffer 60 in at least one method step 94 by means of the transport device 10, in particular by means of the transport element 16. The transport device 10 is then pivoted or tilted in at least one method step 96 in order to transfer the products 12 to the discharge conveyor belt 62. In the case of a pivoting movement or a tilting movement of the transport device 10, at least the guide element 22 of the guide unit 20 of the transport device 10 is pivoted or tilted together with the transport element 16 of the transport unit 14 of the transport device 10 relative to the frame unit 26 of the production installation 28, in particular around the movement axis 30, running at least essentially parallel to the product support surface 18, of the guide unit 20, wherein the guide unit 20 has at least the further guide element 32 for guiding, in particular deflecting, the endless further transport element 34, wherein the further transport element 32 is pivoted or tilted together with the guide element 22 and with the transport unit 14 relative to the frame unit 26. The method 56 can comprise alternative or additional method steps, in particular depending on an application of the method which is appropriate to a person skilled in the art.

Figure 6B:
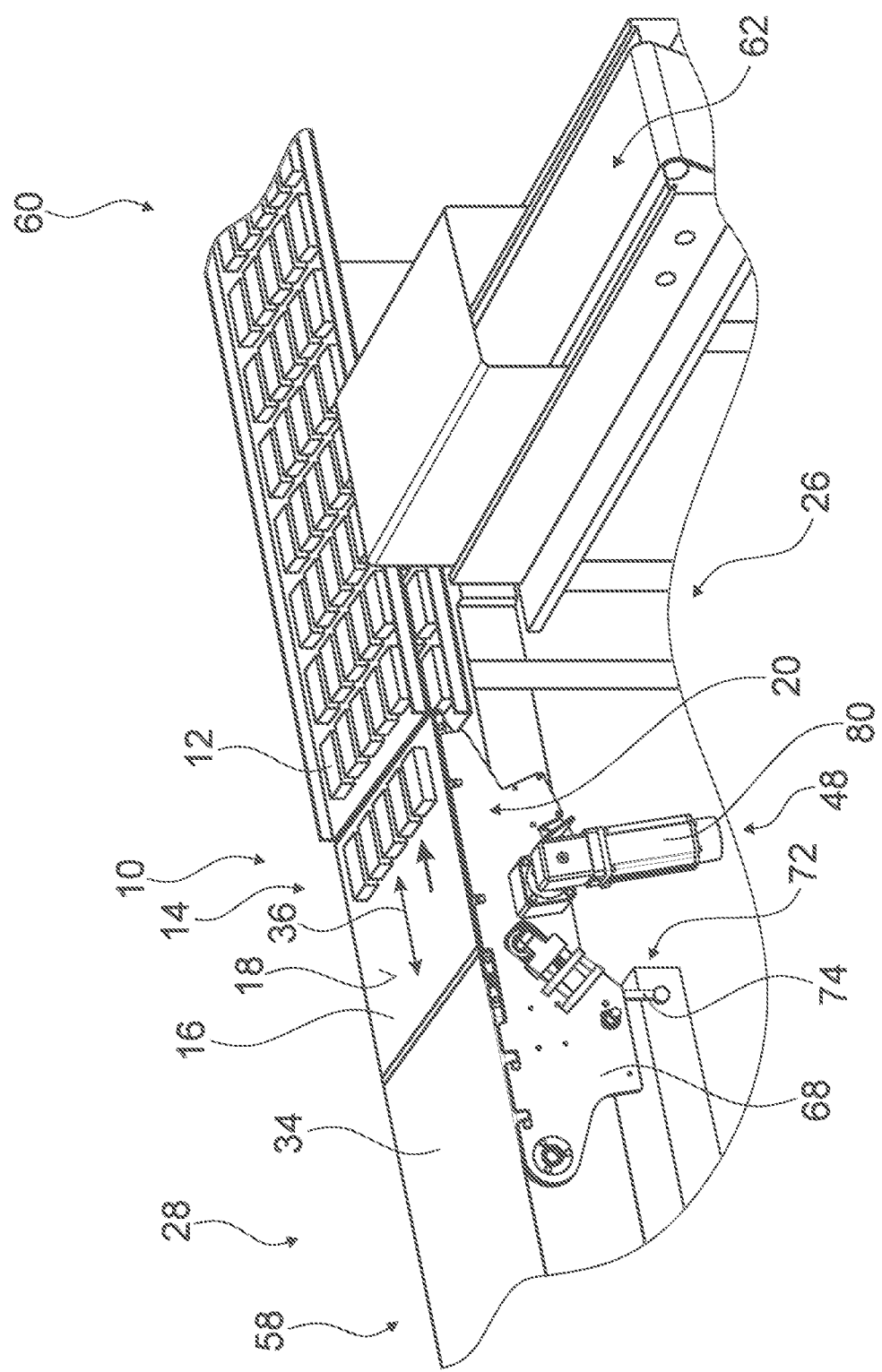
FIG. 6b shows a detailed view of the production installation according to the invention in buffer mode, in which a buffer is loaded with products, in a schematic representation.

FIGS. 6a to 6d show the abovedescribed flow diagram of the method 56 associated with the production installation 28. FIG. 6a shows a discharge mode of the production installation 28, in which products 12 are fed to the discharge conveyor belt 62. The products 12 are preferably transferred to the transport element 16 by means of the main transport unit 58, in particular by means of the further transport element 34. The further transport element 34 and the transport element 16 are preferably driven in the same direction, in particular in the direction toward the discharge conveyor belt 62. With reference to the transport element 16, the direction in which the transport element 16 is moved is indicated with an arrow in FIG. 6a (cf arrow next to the main transport direction 36 in FIG. 6a). The products 12 are preferably transferred by means of the transport element 16 to the discharge conveyor belt 62, in particular in order to effect discharge of the products 12. The transport device 10, in particular the product support surface 18, is preferably inclined relative to the horizontal plane to discharge the products. Should it not be possible to discharge the products 12 as a result of a product jam or malfunction at the discharge conveyor belt 62, the transport device 10, starting from the orientation of the transport device 10, in particular the product support surface 18, inclined relative to the horizontal plane, is pivoted or tilted around the movement axis 30 of the guide unit 20 in order to obtain an orientation of the transport device 10, in particular the product support surface 18, parallel to the horizontal plane (cf FIG. 6b). In the orientation of the transport device 10, in particular the product support surface 18, situated parallel to the horizontal plane, the products 12 can be fed to the buffer 60 by means of the transport element 16, wherein the transport element 16 and the further transport element 34 are driven in the same direction (cf arrow next to the main transport direction 36), in particular in the direction toward the buffer 60. In the orientation of the transport device 10, in particular the product support surface 18, situated parallel to the horizontal plane, the products 12 are transferred from the main transport unit 58, in particular from the further transport element 34, to the transport element 16 which in turn transfers the products 12 to the buffer 60, in particular to load the buffer 60. The transport element 16, the further transport element 34, and the buffer 60 are preferably driven in the same direction (cf arrow next to the main transport direction 36 in FIG. 6b).

If the product jam or the malfunction is cleared, a refeed preferably takes place, i.e. products 12 are received again from the buffer 60 and the products 12 are then transferred to the discharge conveyor belt 62. During the refeed, products 12 which are arranged on the buffer 60 are preferably transferred to the transport device 10, in particular to the transport element 16, wherein the buffer 60 is driven in a direction toward the transport element 16 and the transport element 16 is driven in a direction toward the further transport element 34 (cf arrow next to the main transport direction 36 in FIG. 6c). During the refeed, the transport element 16 and the buffer 60 are preferably moved in an opposite direction to the movement direction of the transport element 16 and the buffer 60 which is followed when loading the buffer 60. When the products 12 are transferred from the buffer 60 to the transport element 16, the buffer 60 and the transport element 16 are preferably moved in the opposite direction, which is oriented toward the further transport element 34. During the refeed, the further transport element 34 can furthermore be driven in the direction of the transport element 16 until products 12 which are being conveyed by means of the further transport element 34 move into a position close to the transport device 10. Movement of the further transport element 34 is preferably stopped as soon as the products 12 which are being conveyed by means of the further transport element 34 during the refeed move into a position close to the transport device 10. A monitoring device (not illustrated in detail here), for example a light barrier, a camera, or the like, can be provided which monitors a region between the transport device 10 and the further transport element 34 in order to stop movement of the further transport element 34 during a refeed, in particular in order to prevent a collision of products 12 which, on the one hand, are being conveyed by means of the transport element 16 in the direction of the further transport element 34 and, on the other hand, are being conveyed by means of the further transport element 34 in the direction of the transport element 16.

Figure 6C:
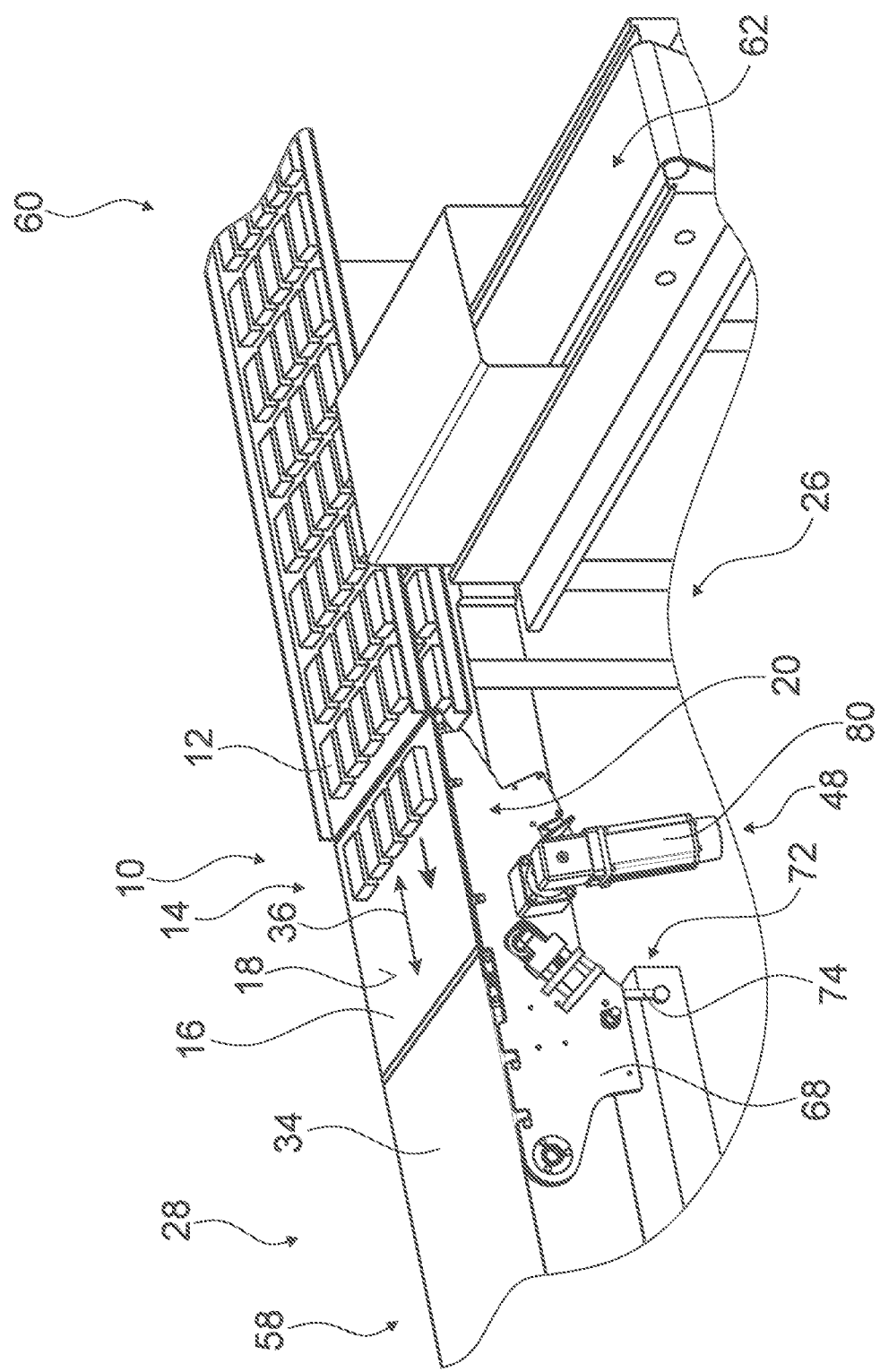
FIG. 6c shows a detailed view of the production installation according to the invention in refeed mode, in which the products are removed from the buffer and fed back to the discharge conveyor belt, in a schematic representation.

After the products 12 have been transferred from the buffer 60 to the transport element 16 during a refeed, a pivoting or tilting movement of the transport device 10, in particular the transport element 16, is effected around the movement axis 30 of the guide unit 20 in order to orient the transport device 10, in particular the product support surface 18, so that it is again inclined relative to the horizontal plane (cf FIGS. 6c and 6d). The deflection region of the further transport element 34 has preferably been pivoted or tilted, in particular has been inclined relative to the horizontal plane, together with the guide unit 20 and the transport unit 14 by means of the bearing unit 24 relative to the frame unit 26, whilst the further region of the further transport element 34 remains unpivoted or untilted, in particular remains oriented parallel to the horizontal plane (cf bend line indicated at reference numeral 34 in FIG. 6d). As soon as the pivoting or tilting movement of the transport device 10, in particular the transport element 16, has finished (cf FIG. 6d), the transport element 16 is driven in the direction toward the discharge conveyor belt 62 and the products 12 are transferred from the transport element 16 to the discharge conveyor belt 62. The transport element 16 is driven in a direction away from the further transport element 34 (cf arrow next to the main transport direction 36 in FIG. 6d). The further transport element 34 is preferably driven again or continues to be driven in the direction toward the transport element 16 in order to transfer the products 12 to the transport element 16 which in turn transfers the products 12 to the discharge conveyor belt 62. FIG. 6d shows the discharge mode of the production installation 28, in which products 12 are fed to the discharge conveyor belt 62. The transport element 16 can be driven in two opposite directions independently of a drive direction of the further transport element 34. The transport element 16 can be driven in two opposite directions independently of a drive direction of the buffer 60.

What is claimed is:

1. A production installation with at least one transport device and with at least one frame unit (26), wherein the transport device for conveying products (12) comprises at least one transport unit (14) which comprises at least one endless transport element (16) which has a product support surface (18) for receiving products (12) to be conveyed, wherein the transport device further comprises at least one guide unit (20) for guiding the transport element (16) and which has at least one guide element (22) for deflecting the transport element (16), and wherein the transport device further comprises at least one bearing unit (24) for pivotable or tiltable support of the guide unit (20) together with the transport unit (14) relative to the frame unit (26) around a movement axis (30) of the guide unit (20), wherein the movement axis (30) runs at least essentially parallel to the product support surface (18), wherein the guide unit (20) has at least one further guide element (32) for deflecting an endless further transport element (34) of the production installation, wherein the production installation further comprises at least one further guide unit, wherein at least one deflection region of the further transport element (34) is arranged at the guide unit (20) and a further region of the further transport element (34) is arranged at the further guide unit, wherein for the purpose of guiding the transport element (16) the further guide element (32) is supported by the bearing unit (24) so that it can be pivoted or tilted together with the guide element (22) and with the transport unit (14) relative to the frame unit (26), whilst the further region of the further transport element (34) remains unpivoted or untilted.

2. The production installation as claimed in claim 1, wherein a maximum longitudinal extent (38) of a transport section (40) of the transport element (16) that can be pivoted or tilted by the bearing unit (24), which runs at least essentially parallel to a main transport direction (36) of the transport unit (14) and extends in a direction running at least essentially parallel to the product support surface (18), is less than 750 mm.

3. The production installation as claimed in claim 1, wherein the at least one further guide element (32) is arranged in a proximity (42) of one end (44) of the guide unit (20) at which a movement axis (30) of the guide unit (20) is arranged.

4. The production installation as claimed in claim 1, wherein the at least one further guide element (32) is arranged spaced apart from the movement axis (30) of the guide unit (20) and has a maximum spacing (46), extending in a direction running at least essentially parallel to the product support surface (18), from the movement axis (30) which is less than 400 mm.

5. The production installation as claimed in claim 1, wherein the transport device further comprises at least one drive unit (48), which comprises at least one drive element (50) for driving the transport element (16) relative to the guide unit (20), wherein at least the drive element (50) is arranged on the guide unit (20) and is supported by the bearing unit (24) so that it can be pivoted or tilted together with the guide unit (20) and the transport unit (14) relative to the frame unit (26).

6. The production installation as claimed in claim 1, wherein the transport device further comprises at least one drive unit (48), which is arranged completely on the guide unit (20) and is supported by the bearing unit (24) so that it can be pivoted or tilted together with the guide unit (20) and the transport unit (14) relative to the frame unit (26).

7. The production installation as claimed in claim 1, wherein the transport device further comprises at least one orienting unit (52) for orienting the transport element (16) relative to the guide unit (20), wherein the orienting unit (52) is arranged on the guide unit (20) and is supported by the bearing unit (24) so that it can be pivoted or tilted together with the guide unit (20) and the transport unit (14) relative to the frame unit (26).

8. The production installation as claimed in claim 1, wherein the transport device further comprises at least one wiping unit (54) for wiping remains of conveyed products (12) from the transport element (16), wherein the wiping unit (54) is arranged on the guide unit (20) and is supported by the bearing unit (24) so that it can be pivoted or tilted together with the guide unit (20) and the transport unit (14) relative to the frame unit (26).

9. A method for conveying products (12) by a transport device of a production installation as claimed in claim 1, wherein at least one guide element (22) of a guide unit (20) of the transport device is pivoted or tilted together with a transport element (16) of a transport unit (14) of the transport device relative to a frame unit (26) of the production installation around a movement axis (30) of the guide unit (20), wherein the movement axis (30) runs at least essentially parallel to the product support surface (18), wherein the guide unit (20) has at least one further guide element (32) for guiding an endless further transport element (34) of the production installation, wherein the further guide element (32) is pivoted or tilted together with the guide element (22) and with the transport unit (14) relative to the frame unit wherein at least one deflection region of the further transport element (34) is pivoted or tilted together with the guide element (22) and with the transport unit (14) by means of a bearing unit (24) of the transport device relative to the frame unit (26), whilst a further region of the further transport element (34) remains unpivoted or untilted.

10. The production installation as claimed in claim 1, wherein the endless transport element (16) and the endless further transport element (34) are embodied as endless conveyor belts.

11. The production installation as claimed in claim 1, wherein the guide element (22) is movably supported and embodied as a guide roller.

12. The production installation as claimed in claim 2, wherein the at least one further guide element (32) is arranged in a proximity (42) of one end (44) of the guide unit (20) at which the movement axis (30) of the guide unit (20) is arranged.

13. A transport device for conveying products (12), with at least one transport unit (14) which comprises at least one endless transport element (16) which has a product support surface (18) for receiving products (12) to be conveyed, with at least one guide unit (20) for guiding the transport element (16) and which has at least one guide element (22), and with at least one bearing unit (24) for pivotable or tiltable support of the guide unit (20) together with the transport unit (14) relative to a frame unit (26) of a production installation, wherein the guide unit (20) has at least one further guide element (32) for guiding an endless further transport element (34), wherein for the purpose of guiding the transport element (16) the further guide element (32) is supported by the bearing unit (24) so that it can be pivoted or tilted together with the guide element (22) and with the transport unit (14) relative to the frame unit (26), wherein the transport device further comprising at least one orienting unit (52) for orienting the transport element (16) relative to the guide unit (20), wherein the orienting unit (52) is arranged on the guide unit (20) and is supported by the bearing unit (24) so that it can be pivoted or tilted together with the guide unit (20) and the transport unit (14) relative to the frame unit (26).

14. A transport device for conveying products (12), with at least one transport unit (14) which comprises at least one endless transport element (16) which has a product support surface (18) for receiving products (12) to be conveyed, with at least one guide unit (20) for guiding the transport element (16) and which has at least one guide element (22), and with at least one bearing unit (24) for pivotable or tiltable support of the guide unit (20) together with the transport unit (14) relative to a frame unit (26) of a production installation, wherein the guide unit (20) has at least one further guide element (32) for guiding an endless further transport element (34), wherein for the purpose of guiding the transport element (16) the further guide element (32) is supported by the bearing unit (24) so that it can be pivoted or tilted together with the guide element (22) and with the transport unit (14) relative to the frame unit (26), wherein the transport device further comprising at least one wiping unit (54) for wiping remains of conveyed products (12) from the transport element (16), wherein the wiping unit (54) is arranged on the guide unit (20) and is supported by the bearing unit (24) so that it can be pivoted or tilted together with the guide unit (20) and the transport unit (14) relative to the frame unit (26).

* * * * *